United States Patent [19]

Hamann et al.

[11] 4,293,582

[45] Oct. 6, 1981

[54] POTATO DOUGH WITH PROCESS OIL FOR FORMED AND EXTRUDED POTATO PRODUCTS

[75] Inventors: Michael L. Hamann; Richard K. Pinegar, both of Caldwell, Id.

[73] Assignee: J. R. Simplot Company, Boise, Id.

[21] Appl. No.: 157,257

[22] Filed: Jun. 9, 1980

[51] Int. Cl.³ ............................................. A23L 1/216
[52] U.S. Cl. ..................................... 426/637; 426/808
[58] Field of Search ............... 426/637, 808, 438, 439, 426/440, 441, 272, 638, 262, 268, 270

[56] References Cited

U.S. PATENT DOCUMENTS

| | | | |
|---|---|---|---|
| 3,085,020 | 4/1963 | Backinger et al. | 426/637 |
| 3,109,739 | 11/1963 | Hilton | 426/441 X |
| 3,468,673 | 9/1969 | Keller | 426/441 X |
| 3,968,265 | 7/1976 | Shatila et al. | 426/637 X |
| 3,988,484 | 10/1976 | Shatila | 426/637 X |
| 4,082,855 | 4/1978 | Citti et al. | 426/637 X |
| 4,135,004 | 1/1979 | Finkel | 426/637 X |
| 4,156,744 | 5/1979 | Kiploks et al. | 426/637 |
| 4,238,517 | 12/1980 | Bosley et al. | 426/637 X |

*Primary Examiner*—Arthur L. Corbin
*Attorney, Agent, or Firm*—Fulwider, Patton, Rieber, Lee & Utecht

[57] ABSTRACT

The invention provides for addition of a process oil in a liquid state, such as a vegetable oil, an animal fat or blend thereof to potato dough ingredients to enhance tenderness and crispness in the finished formed potato product and to reduce occurrences of "feathering" and "overmixing" of the dough during processing. Accordingly, a liquid oil addition of from about 0.12 weight percent to less than about 2.0 weight percent to the potato dough ingredients is presently preferred as producing the most desirable end product with respect to crispness, flavor, and interior and exterior characteristics. In one embodied form of the invention, the process oil may be added by incorporation of finely chopped, par-fried, frozen, potato eliminations into the potato dough. If eliminations are incorporated, a maximum of about 4.0 weight percent process oil in the potato dough can be utilized in accordance with the present invention.

17 Claims, No Drawings

POTATO DOUGH WITH PROCESS OIL FOR FORMED AND EXTRUDED POTATO PRODUCTS

BACKGROUND OF THE INVENTION

This invention relates to a potato dough composition comprising a process oil, for instance, a vegetable oil, an animal fat or blends thereof, which is added to the dough ingredients during mixing to enhance tenderness and crispness in the finished potato product and to facilitate handling and forming of the dough.

Various methods have been developed for producing fabricated potato products from potato doughs. These products simulate conventional potato products, for instance, french fries cut from fresh potatoes. U.S. Pat. No. 4,156,744 issued to Kiplocks et al on May 29, 1979 for "Process for Forming Shaped Potato Products and Products Resulting Therefrom", discloses one such method designed to result in a finished potato product having a tender and crisp exterior and without substantial pastiness.

In this respect, it is believed that the pasty quality results from "overmixing" of the ingredients, thereby causing starch damage and excessive release of free starch in the dough. Moreover, overmixing of the dough ingredients can result in too sticky a mixture making proper forming of the dough extremely difficult. While a gentle and brief mixing of the dough ingredients reduces the chance of overmixing, this procedure is usually ineffective for producing a uniform mixture.

During forming of the potato dough, such as by extrusion through a die orifice, "featuring" or jagged edges can occur on the extruded dough, which is deleterious in terms of achieving a final product with desirable characteristics. Although an increase in potato dough moisture content can help alleviate feathering, the reconstituted product will generally lose crispness and become limp.

Accordingly, those skilled in the art have recognized a significant need for a potato dough composition which will reduce the chance of "overmixing" and "feathering" of the dough during processing but without resulting in a tough exterior surface of the final reconstituted potato product. The present invention fulfills this need.

Other features and advantages of the invention will become apparent from the following more detailed description of the preferred embodiments taken in conjunction with the appended claims.

SUMMARY OF THE INVENTION

The invention provides for addition of a process oil, such as a vegetable oil, an animal fat or blend thereof to potato dough ingredients to enhance tenderness and crispness in the finished form potato product and to improve handling characteristics of the dough during processing.

In accordance with a presently preferred embodiment of the invention, a potato dough for formed and extruded potato products is composed of a mixture consisting essentially of:

i. from about 45 to about 75 weight percent cooked, mash potatoes;
ii. from about 9 to about 20 weight percent dehydrated potato flakes;
iii. from about 0.12 to less than about 2.0 weight percent of process oil in a liquid state selected from the group consisting of vegetable oils, animal fats and blends thereof; and
iv. from about 17 to about 27 weight percent of an aqueous slurry including an effective amount of binding agent.

In one embodied form of the invention the process oil may be added by incorporation of finely chopped, parfried frozen, potato eliminations into the potato dough. If such eliminations are incorporated, a maximum of about 4.0 weight percent process oil in the potato dough can be utilized in accordance with the present invention.

DESCRIPTION OF THE PREFERRED EMBODIMENT

The present invention provides for addition of a process oil, for instance, a vegetable oil, an animal fat or blend thereof to potato dough ingredients to enhance tenderness and crispness in the finished potato product and to reduce occurrences of "feathering" and "overmixing" and to facilitate handling of the dough during processing.

Accordingly, it has been determined that a process oil content within a range of from about 0.12 weight percent to less than 2.0 weight percent, when the process oil is added in a liquid state, is especially helpful in that it gives the potato dough product much more latitude for forming, as by use of a rotary former, than is experienced without such oil. Moreover, the foregoing oil content has been determined to produce the most desirable end product with respect to crispness, flavor and interior and exterior characteristics.

The process oil in accordance with the invention may be any conventional vegetable oil, animal fat or blends thereof, which is mixed in a liquid state with the potato dough ingredients prior to shaping of the dough. The oil improves handling of the dough and enables the dough to release from the forming equipment more easily. The term "process oil" as used in this disclosure is meant to include both liquid and solid fats conventionally used in preparing frozen fried products. For example, suitable oils include palm oil, soybean oil, cottonseed oil, sunflower seed oil, safflower oil, vegetable oils, palm kernal oil, animal fats and the like.

In one embodied form, the incorporation of finely chopped, par-fried, frozen french fry elimination into the potato dough is utilized as a means for achieving the process oil content in the dough. Various other additives may also be included in the dough mixture, such as tallow, monoglycerides, diglycerides, polyglycerol esters, calcium and or sodium lactylates or other food grade emulsifiers and lubricants.

It has been determined that when process oil in a liquid form is added to the potato dough ingredients in an amount higher than 2.0 weight percent, the dough becomes increasingly fragile as the amount of process oil increases. However, if the process oil is added by means of par-fried, frozen eliminations incorporated with the dough ingredients, and greater amount of process oil content, that is, about 4.0 weight percent will still produce an acceptable product in accordance with the present invention.

The potato dough in accordance with the invention may be prepared from about 45 to about 75 weight percent cooked, mashed potatoes, about 9 to about 20 weight percent dehydrated potato flakes, about 0.12 to less than about 2.0 weight percent liquid process oil, about 17 to 27 weight percent aqueous slurry of an effective amount of cellulosic materials and guar gum, and an effective amount of dry additives such as seasonings, coloring agents (e.g., dextrose) and starch binders and the like. Alternatively, the dough may also include other potato materials such as dehydrated potato granules and par-fried, frozen, potato eliminations.

Typically, the par-fried eliminations are obtained as a by-product from processes requiring the use of whole natural potatoes, such as the one disclosed in Strong, U.S. Pat. No. 3,397,993 which is hereby incorporated by reference. After the fresh potatoes are peeled, trimmed to remove defects, the whole potatoes are cut to produce segments of substantially uniform dimensions, for use in the Strong process.

After parfrying and freezing, a portion of the smallest pieces of potato by-product from this procedure, so-called "eliminations", which are generally the outer portion of the whole potato and broken segments, may then be chopped into still smaller pieces, for example, from about 1 to about 3 millimeters in diameter. These eliminations, which have been par-fried in one of the aforementioned process oils for about 45 seconds at a temperature of from about 340° to about 370° F., typically have an oil content within a range of from about 6 to about 9 percent by weight.

Accordingly, the frozen par-fried eliminations in an amount between about 1 and 45 weight percent may be incorporated into the potato dough as a sole means for achieving a process oil content within a range of from about 0.12 weight percent to about 4.0 weight percent, or the eliminations may be incorporated in conjunction with liquid process oil added to the dough ingredients. In this regard, a maximum of about 2.2 weight percent liquid process oil may be utilized if par-fried frozen eliminations are also included in the dough mixture. Thus, for instance, about 20 percent by weight frozen par-fried eliminations having a process oil content of 9 percent by weight have been incorporated into a dough containing up to about 2.2 weight percent liquid process oil as an upper limit for process oil (4.0 percent by weight) which will still produce an acceptable potato dough in accordance with the invention.

Various other ingredients such as preservatives, vitamin supplements and the like may also be included in the dough mixture.

In more detail, the aqueous slurry to bind the potato mash together and to inhibit fat absorption during subsequent frying, comprises an effective amount of a mixture of about 89 weight percent microcrystalline cellulose, and about 11 weight percent carboxymethyl cellulose, and guar gum.

To insure complete dispersion and rehydration of the guar gum and cellulosic materials, these ingredients are dry blended, then mixed with water, stirred and allowed to age in a liquid state for a period of time from about 2 minutes to about 4 hours or longer. The aging process allows the guar gum to achieve a relatively high viscosity level before addition to the dough ingredients.

The amount of water added to the dough ingredients should be sufficient to give the dough a final moisture content within a range of from about 62 weight percent to about 74 weight percent. A moisture content within a range of from about 66 to about 70 weight percent is presently preferred for producing a dough with the most desirable handling characteristics for subsequent forming.

Preferably the ingredients are mixed in the following manner. The riced mashed potatoes, at a temperature of between about 145°–165° F. are contained within a mixing vessel. The oil, in a liquid state, is added to the mashed potatoes, and then the aqueous slurry at about 40°–45° F. is included in the mixture. Finally, dry additives and potato flakes are admixed with the foregoing ingredients. The ingredients are mixed for a period of from 1 to 6 minutes. Subsequent to mixing, the dough is preferably kneaded and maintained at a temperature of between about 90° F. and 110° F. before being fed to suitable apparatus such as a rotary former or extrusion die, for forming the dough into the desired shape.

Extrusion pressures of from about 5 to 50 lbs. per square inch gauge (PSIG) have been found to produce the most desirable product. At pressures about 50 psig the product may become dense, tough and undesirable.

After the potato dough is formed into the desired configuration, the product is par-fried in hot frying oil preferably at a temperature of from about 350° F. to about 375° F. for about 25 to about 60 seconds. In this regard, the temperature of the frying oil should be sufficiently high to par-fry the dough into the final product, but not so high as to burn the oil.

As previously mentioned, the addition of process oil to the dough mixture may also be accomplished by the addition of finely chopped, par-fried, frozen french fry eliminations. Accordingly, a large and constant supply of eliminations is desirable and should be fed, cut and added to the dough in a frozen state.

The following examples will further serve to illustrate the principles of the present invention.

EXAMPLE 1

A potato dough for making french fries reconstituted by final frying was prepared from the following proportions of ingredients:
 about 60.56 weight percent cooked, mashed potatoes;
 about 21.52 weight percent aqueous slurry comprising about 0.44 weight percent microcrystalline cellulose, about 0.06 weight percent carboxymethyl cellulose and about 0.46 weight percent guar gum;
 about 16.58 weight percent dehydrated potato flakes;
 about 1.10 weight percent dry additives including about 0.54 weight percent salt, about 0.36 weight percent dextrose, about 0.15 weight percent modified tapioca starch and about 0.10 weight percent SAPP (Non-leavening); and
 about 0.24 weight percent vegetable oil.

A 250 lb. batch of the above ingredients were mixed in a Peerless mixer model DA 120. The oil, mashed potatoes and aqueous slurry were mixed for about one minute. Thereafter, the dry additives were admixed with the blended ingredients for about one minute and finally the potato flakes were mixed for an additional two minutes. At the completion of mixing, the batch mixer was emptied into a dough trough by dumping. The dough trough was lifted to the hopper above a dough sheeter. A gate was opened in the bottom of the dough trough and the mixture was dumped into the feed hopper for the sheeter. The mixture flowed well out of the dough trough. The sheeter produced an even sheet of uniform thickness across the entire width. A Werner Lehara rotary former with trismatic forming roll was used to form the potato dough. The product released from the machine roll onto the take-away belt without the assistance of a doctor knife. No feathering or cracking of the potato dough products occurred. The product was par-fried at 370° F. for about 42.5 seconds. The resultant product revealed good flavor, good color and good interior and exterior quality.

EXAMPLE 2

A potato dough for making french fries reconstituted by final baking was prepared from the following proportions of ingredients:
- about 58.46 weight percent cooked, mashed potatoes;
- about 20.54 weight percent aqueous slurry comprising about 0.44 weight percent microcrystalline cellulose, about 0.06 weight percent carboxymethyl cellulose and about 0.41 weight percent guar gum;
- about 16.79 weight percent potato flakes;
- about 2.18 weight percent dry additives including about 0.06 weight percent dextrose, 0.55 weight percent salt, and about 0.02 weight percent Vitamin C, about 0.21 weight percent modified tapioca starch, about 0.10 weight percent SAPP; and
- about 2.03 weight percent vegetable oil The procedure of Example 1 was repeated to produce a 250 lb. batch. The resultant product was too fragile and breakage of the product occurred after forming.

EXAMPLE 3

A potato dough for making french fries reconstituted by final frying was prepared from the following proportions of ingredients: about 39.6 weight percent cooked, mashed potatoes; about 20.8 weight percent aqueous slurry comprising about 0.45 weight percent microcrystalline cellulose, about 0.06 weight percent carboxymethyl cellulose and about 0.5 weight percent guar gum; about 2.1 weight percent dry additives including about 0.6 weight percent dextrose, about 0.55 weight percent salt, about 0.2 weight modified tapioca starch, about 0.10 weight percent SAPP and about 0.02 weight percent Vitamin C; about 18.7 weight percent potato flakes; about 18 weight percent recycled dough of the foregoing ingredients; and about 1 weight percent vegetable oil.

The procedure of Example 1 was repeated to produce a 40 lb. batch of potato dough and a resultant product. The product was of good color, crisp, slightly tough, good flavor, good interior and exterior, not oily, and with a desirably mealy interior.

EXAMPLE 4

A potato dough for making french fries reconstituted by final frying was prepared from the following porportions of ingredients:
- about 60.62 weight percent cooked, mashed potatoes;
- about 20.62 weight percent water;
- about 16.59 weight percent dehydrated potato flakes;
- about 0.52 weight percent salt;
- about 0.45 weight percent guar gum;
- about 0.44 weight percent microcrystalline cellulose;
- about 0.35 weight percent dextrose;
- about 0.14 weight percent modified tapioca starch;
- about 0.12 weight percent soy oil;
- about 0.10 weight percent SAPP;
- about 0.05 weight percent carboxymethyl cellulose.

The procedure of Example 1 was repeated to produce a 577.4 pound batch of potato dough and resultant product. The product revealed good flavor, good color good interior and exterior quality.

EXAMPLE 5

A potato dough for making french fries reconstituted by final baking was prepared from the following proportions of ingredients:
- about 58.90 weight percent riced, mashed potatoes;
- about 19.74 weight percent water;
- about 17.14 weight percent dehydrated potato flakes;
- about 1.01 weight percent vegetable oil;
- about 0.95 weight percent RAW High Amylose Corn starch;
- about 0.57 weight percent dextrose;
- about 0.52 weight percent salt;
- about 0.46 weight percent guar gum;
- about 0.45 weight percent microcrystalline cellulose;
- about 0.10 weight percent SAPP;
- about 0.06 weight percent vitamin C;
- about 0.05 weight percent carboxymethyl cellulose;
- about 0.05 weight percent artificial flavor.

A similar procedure to the procedure of Example 1 was repeated to produce a 40.0 pound batch of potato dough. The riced mashed potatoes, vegetable oil, and solution of water, guar gum, microcrystalline cellulose, carboxymethyl cellulose and artificial flavor were mixed for one minute. The corn starch, dextrose, salt, SAPP and vitamin C were then blended with the foregoing mixture for about one minute. The dehydrated potato flakes were then finally blended in the mixture for an additional one minute. The resultant potato dough was formed into fry strips, parfried at 360° F. for about sixty seconds, then frozen. The product was finally reconstituted by baking in a conventional oven at 450° for about nine minutes. The product revealed good flavor, good color and good interior and exterior quality.

EXAMPLE 6

A potato dough for making french fries reconstituted by final baking was prepared from the following proportions of ingredients:
- about 39.68 weight percent riced mashed potatoes;
- about 19.90 weight percent water
- about 18.80 weight percent dehydrated potato flakes;
- about 18.52 weight percent frozen parfried eliminations having about 9 weight percent proces oil
- about 0.92 weight percent RAW high amylose corn starch;
- about 0.55 weight percent dextrose;
- about 0.50 weight percent salt;
- about 0.48 weight percent guar gum;
- about 0.45 weight percent microcrystalline cellulose;
- about 0.10 weight percent SAPP;
- about 0.05 weight percent vitamin C.
- about 0.05 weight percent carboxymethyl cellulose.

A similar procedure to the procedure of Example 1 was repeated to produce a 40.0 pound batch of potato dough. The riced mashed potatoes, solution of water, guar gum, microcrystalline cellulose and carboxymethyl cellulose were mixed for about one minute. Thereafter, the corn starch, dextrose, salt, SAPP and vitamin C were added and mixed for one minute. The frozen parfried eliminations were then added and mixed for one minute. Finally, the dehydrated potato flakes were added and mixed for one minute. The potato dough, having about 1.68 weight percent process oil, was formed into fry strips and parfried at about 360° F. for about sixty seconds, then frozen. The product was finally reconstituted by baking in a conventional oven at 450° for about nine minutes. The product revealed good flavor, good color and good interior and exterior quality.

EXAMPLE 7

A potato dough for making french fries reconstituted by final baking was prepared from the following proportions of ingredients:
- about 40.40 weight percent riced mashed potatoes;
- about 20.26 weight percent water
- about 18.86 weight percent frozed parfried eliminations having nine percent by weight process oil
- about 15.27 weight percent dehydrated potato flakes;
- about 2.06 weight percent vegetable oil;
- about 0.94 weight percent RAW High Amylose corn starch;
- about 0.56 weight percent dextrose;
- about 0.51 weight percent salt; about 0.48 weight percent guar gum;
- about 0.46 weight percent microcrystalline cellulose;
- about 0.10 weight percent SAPP;
- about 0.05 weight percent vitamin C;
- about 0.05 weight percent carboxymethyl cellulose.

The procedure of Example 6 was repeated to produce a 39.29 pound batch of potato dough having a total process oil content of about 3.77 weight percent. The riced, mashed potatoes, vegetable oil and solution of water, guar gaum, microcrystalline cellulose and carboxymethyl cellulose were first mixed together for about one minute. The corn starch, dextrose, salt, SAPP and vitamin C were then added and mixed for an additional one minute. The frozen parfried eliminations were subsequently added and mixed for one minute. Finally, the dehydrated potato flakes were added and mixed for one minute.

The potato dough having 3.77 weight percent process oil was formed into fry strips and parfried at about 360° F. for about sixty seconds, then frozen. The product was finally reconstituted by baking in a conventional oven at 450° F. for about nine minutes. The product revealed good flavor, good color and good interior and exterior quality.

This invention has been described with reference to a preferred mode of practice. It is not intended that the invention be unduly limited by this disclosure. Instead, it is intended that the invention be defined by the method steps and ingredients, and their obvious equivalents set forth in the following claims.

We claim:

1. A potato dough for formed and extruded potato products, the dough composed of a mixture consisting essentially of:
   i. from about 45 to about 75 weight percent cooked mashed potatoes;
   ii. from about 9 to about 20 weight percent dehydrated potato flakes;
   iii. from about 0.12 to less than about 2.0 weight percent of liquid process oil selected from the group consisting of vegetable oils, animal fats and blends thereof; and
   iv. from about 17 to about 27 weight percent of an aqueous slurry of an effective amount of binding agent.

2. The potato dough of claim 1 wherein said dough has a moisture content of from about 62 weight percent to about 74 weight percent.

3. The potato dough of claim 1 wherein said dough has a moisture content of from about 66 weight percent to about 70 weight percent.

4. The potato dough of claim 1 and further including an effective amount of seasonings.

5. The potato dough of claim 1 and further including an effective amount of coloring agents.

6. The potato dough of claim 5 wherein said coloring agent is dextrose.

7. The potato dough of claim 1 wherein said process oil, is obtained at least in part from parfried potato frozen potato eliminations having from about 6 to 9 weight percent process oil.

8. The potato dough of claim 1 wherein said vegetable oil is selected from the group consisting of palm oil, palm kernal oil, soybean oil, cottonseed oil, safflower oil, sunflower oil and blends thereof.

9. The potato dough of claim 1 wherein said binding agent is a mixture of microcyrstalline cellulose and carboxymethylcellulose, and guar gum.

10. A potato dough for formed and extruded potato products, the dough composed of a mixture consisting essentially of:
    i. from about 45 to about 75 weight percent cooked mash potatoes;
    ii. from about 9 to about 20 weight percent dehydrated potato flakes;
    iii. from about 0.12 to about 2.2 weight percent of liquid process oil selected from the group consisting of vegetable oils, animal fats and blends thereof;
    iv. from about 1 to about 45 weight percent of parfried, frozen potato eliminations having from about 6 to about 9 weight percent process oil; and
    v. from 17 to about 27 weight percent of an aqueous slurry of an effective amount of binding agent.

11. The potato dough of claim 10 wherein said dough has a moisture content of from about 62 weight percent to about 74 weight percent.

12. The potato dough of claim 10 wherein said dough has a moisture content of from about 66 weight percent to about 70 weight percent.

13. The potato dough of claim 10 and further including an effective amount of seasonings.

14. The potato dough of claim 10 and further including an effective amount of coloring agents.

15. The potato dough of claim 14 wherein said coloring agent is dextrose.

16. The potato dough of claim 10 wherein said vegetable oil is selected from the group consisting of palm oil, palm kernal oil, soybean oil, cottonseed oil, safflower oil, sunflower oil and blends thereof.

17. The potato dough of claim 10 wherein said binding agent is a mixture of microcrystalline cellulose and carboxymethylcellulose, and guar gum.

* * * * *

UNITED STATES PATENT AND TRADEMARK OFFICE
CERTIFICATE OF CORRECTION

PATENT NO. : 4,293,582
DATED : October 6, 1981
INVENTOR(S) : Michael L. Hamann and Richard K. Pinegar It is certified that error appears in the above—identified patent and that said Letters Patent is hereby corrected as shown below:

In the title, delete "POTATO", second occurrence.
Column 2, line 46, delete "elimination" and insert therefor --eliminations--.
Column 4, line 12, after "to", insert --about--.
Column 5, line 16, delete "0.06" and insert therefor --0.60--;
Column 5, line 67, after "color", insert --and--.

Signed and Sealed this

Nineteenth Day of January 1982

[SEAL]

Attest:

GERALD J. MOSSINGHOFF

*Attesting Officer*  *Commissioner of Patents and Trademarks*